US012712214B2

(12) United States Patent
Trask

(10) Patent No.: US 12,712,214 B2
(45) Date of Patent: Aug. 18, 2026

(54) THERMALLY TRIGGERED ADHESIVE RELEASE FOR BATTERY SERVICE

(71) Applicant: GM GLOBAL TECHNOLOGY OPERATIONS LLC, Detroit, MI (US)

(72) Inventor: Simon James Hammond Trask, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 345 days.

(21) Appl. No.: 18/450,658

(22) Filed: Aug. 16, 2023

(65) Prior Publication Data

US 2025/0062430 A1 Feb. 20, 2025

(51) Int. Cl.

| | |
|---|---|
| ***H01M 10/54*** | (2006.01) |
| ***B60K 1/04*** | (2019.01) |
| ***B60L 53/80*** | (2019.01) |
| ***B60L 58/27*** | (2019.01) |
| ***B60S 5/06*** | (2019.01) |
| ***H01M 10/48*** | (2006.01) |

(Continued)

(52) U.S. Cl.
CPC ............... *H01M 10/54* (2013.01); *B60K 1/04* (2013.01); *B60L 53/80* (2019.02); *B60L 58/27* (2019.02); *B60S 5/06* (2013.01); *H01M 10/486* (2013.01); *H01M 10/613* (2015.04); *H01M 10/625* (2015.04); *H01M 10/633* (2015.04); *H01M 10/6556* (2015.04); *H01M 10/656* (2015.04); *H01M 50/249* (2021.01); *B60K 2001/0416* (2013.01); *B60L 50/66* (2019.02); *H01M 2220/20* (2013.01)

(58) Field of Classification Search
CPC .. H01M 10/54; H01M 10/613; H01M 10/625; H01M 10/633; H01M 10/6556; H01M 10/656; H01M 50/249; H01M 10/486; H01M 2220/20; H01M 10/60; H01M 10/443; H01M 10/637; B60L 58/27; B60L 53/80; B60L 50/66; B60K 1/04; B60K 2001/0416; B60S 5/06
See application file for complete search history.

(56) References Cited

U.S. PATENT DOCUMENTS

2023/0207918 A1* 6/2023 Bahei-Eldin .......... H01M 10/63 320/150

FOREIGN PATENT DOCUMENTS

CN 217035874 U 7/2022
DE 102021110914 A1 * 11/2022 .............. B60L 53/80

OTHER PUBLICATIONS

Espace translation of DE 10 2021110914 A1 (Year: 2022).*
(Continued)

*Primary Examiner* — Vivek D Koppikar
*Assistant Examiner* — Scott Lawrence Strickler
(74) *Attorney, Agent, or Firm* — CANTOR COLBURN LLP

(57) ABSTRACT

Aspects of the disclosure include systems and methods for leveraging a thermally triggered adhesive release for battery service. An exemplary method can include receiving a battery pack having an adhesive layer at an interface between a cooling plate and a component. A heating fluid is directed through an enclosed volume of the cooling plate and a temperature of the adhesive layer is measured. Responsive to determining that the temperature has reached a target temperature, a load is applied to the component until the component is removed.

17 Claims, 6 Drawing Sheets

(51) Int. Cl.

| | |
|---|---|
| ***H01M 10/613*** | (2014.01) |
| ***H01M 10/625*** | (2014.01) |
| ***H01M 10/633*** | (2014.01) |
| ***H01M 10/6556*** | (2014.01) |
| ***H01M 10/656*** | (2014.01) |
| ***H01M 50/249*** | (2021.01) |
| *B60L 50/60* | (2019.01) |

(56) References Cited

OTHER PUBLICATIONS

Revalpha RA98-LS(N) Information; 3 pages; https://cloud2.shopsite.com/semicorp/revalpha-3198-details.html.
Thermal Release Sheet for Electronic Component Processing REVALPHA; Nitto; 5 pages; https://www.nitto.com/us/en/products/e_parts/electronic001/#:~:text=The%20thermal%20release%20tape%20%22REVALPHA,various%20electronic%20component%20manufacturing%20processes.
German Office Action for German Application No. 102023133314.3; dated Jun. 2, 2025; 4 pages.

* cited by examiner

400

THERMALLY TRIGGERED ADHESIVE RELEASE FOR BATTERY SERVICE

INTRODUCTION

The subject disclosure relates to battery cell technologies, and particularly to thermally triggered adhesive release for battery service.

High voltage electrical systems are increasingly used to power the onboard functions of both mobile and stationary systems. For example, in motor vehicles, the demand to increase fuel economy and reduce emissions has led to the development of advanced electric vehicles (EVs). EVs rely upon Rechargeable Energy Storage Systems (RESS), which typically include one or more high voltage battery packs, and an electric drivetrain to deliver power from the battery to the wheels. Battery packs can include any number of interconnected battery modules depending on the power needs of a given application. Each battery module includes a collection of conductively coupled electrochemical cells. The battery pack is configured to provide a Direct Current (DC) output voltage at a level suitable for powering a coupled electrical and/or mechanical load (e.g., an electric motor).

Modern automotive high voltage battery packs often use adhesives and sealers to join structural components and to manage various dynamic behaviors internal to the battery pack. For example, adhesives could be used to retain battery cells during high acceleration events, to reduce the thermal resistance of a gap between the power electronics or battery cell and the heat sink assemblies, and/or to restrict access of gases or liquids inside the pack to specific areas or from exiting the battery pack assembly. There are many properties that are important to the performance of an adhesive or sealer in a battery and those properties can vary depending on the needs of a particular application. However, regardless of an adhesive's primary function adhesion strength, bulk strength, and young's modulus are determinative for maintaining a necessary bond that prevents separation of a respective joint.

SUMMARY

In one exemplary embodiment a vehicle includes an electric motor, a battery pack electrically coupled to the electric motor, and a thermal management system coupled to the battery pack. The thermal management system includes a cooling plate, an upper tray, and a lower tray joined to opposite surfaces of the cooling plate to define an enclosed volume therebetween. The thermal management system further includes a memory, computer readable instructions, and one or more processors for executing the computer readable instructions. The computer readable instructions control the one or more processors to perform operations. The operations include modifying at least one of a flowrate and a temperature of a heating fluid through the enclosed volume, measuring a temperature of an adhesive layer coupled to the cooling plate and a component of the battery pack, and responsive to determining that the temperature has reached a target temperature, applying a load to the component until the component is removed.

In addition to one or more of the features described herein, in some embodiments, applying the load to the component includes applying one or more of a peeling load, a shearing load, and a tensile load to the component until cohesive or adhesive failure of the adhesive layer.

In some embodiments, the enclosed volume includes one or more fluid flow channels, a fluid inlet, and a fluid outlet for circulation of the heating fluid.

In some embodiments, modifying at least one of the flowrate and the temperature of the heating fluid through the enclosed volume includes increasing one or more of the flowrate and the temperature responsive to the measured temperature being below the target temperature. In some embodiments, modifying at least one of the flowrate and the temperature of the heating fluid through the enclosed volume includes decreasing one or more of the flowrate and the temperature responsive to the measured temperature being above the target temperature.

In some embodiments, a temperature of the component is measured and one or more of the flowrate and the temperature of the heating fluid are decreased responsive to the temperature of the component being within a predetermined threshold of a thermal limit.

In another exemplary embodiment a thermal management system can include a cooling plate, an upper tray, and a lower tray joined to opposite surfaces of the cooling plate to define an enclosed volume therebetween. The thermal management system can further include a memory, computer readable instructions, and one or more processors for executing the computer readable instructions. The computer readable instructions control the one or more processors to perform operations. The operations include modifying at least one of a flowrate and a temperature of a heating fluid through the enclosed volume, measuring a temperature of an adhesive layer coupled to the cooling plate and a component of a battery pack, and responsive to determining that the temperature has reached a target temperature, applying a load to the component until the component is removed.

In yet another exemplary embodiment a method for thermally triggering an adhesive release for battery service can include receiving a battery pack having an adhesive layer at an interface between a cooling plate and a component. A heating fluid is directed through an enclosed volume of the cooling plate and a temperature of the adhesive layer is measured. Responsive to determining that the temperature has reached a target temperature, a load is applied to the component until the component is removed.

In some embodiments, the adhesive includes a material having a known bond strength as a function of temperature.

In some embodiments, directing the heating fluid through the enclosed volume causes a convective heat transfer from the heating fluid to the adhesive layer.

In some embodiments, applying the load to the component includes applying one or more of a peeling load, a shearing load, and a tensile load to the component until cohesive or adhesive failure of the adhesive layer.

In some embodiments, the enclosed volume includes one or more fluid flow channels, a fluid inlet, and a fluid outlet for circulation of the heating fluid.

In some embodiments, a temperature of the component is measured and one or more of a flowrate and a temperature of the heating fluid is decreased responsive to the temperature of the component being within a predetermined threshold of a thermal limit.

In some embodiments, a pre-service including a debussing is performed prior to directing the heating fluid through the enclosed volume of the cooling plate.

In some embodiments, the removed component is replaced with a new component.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
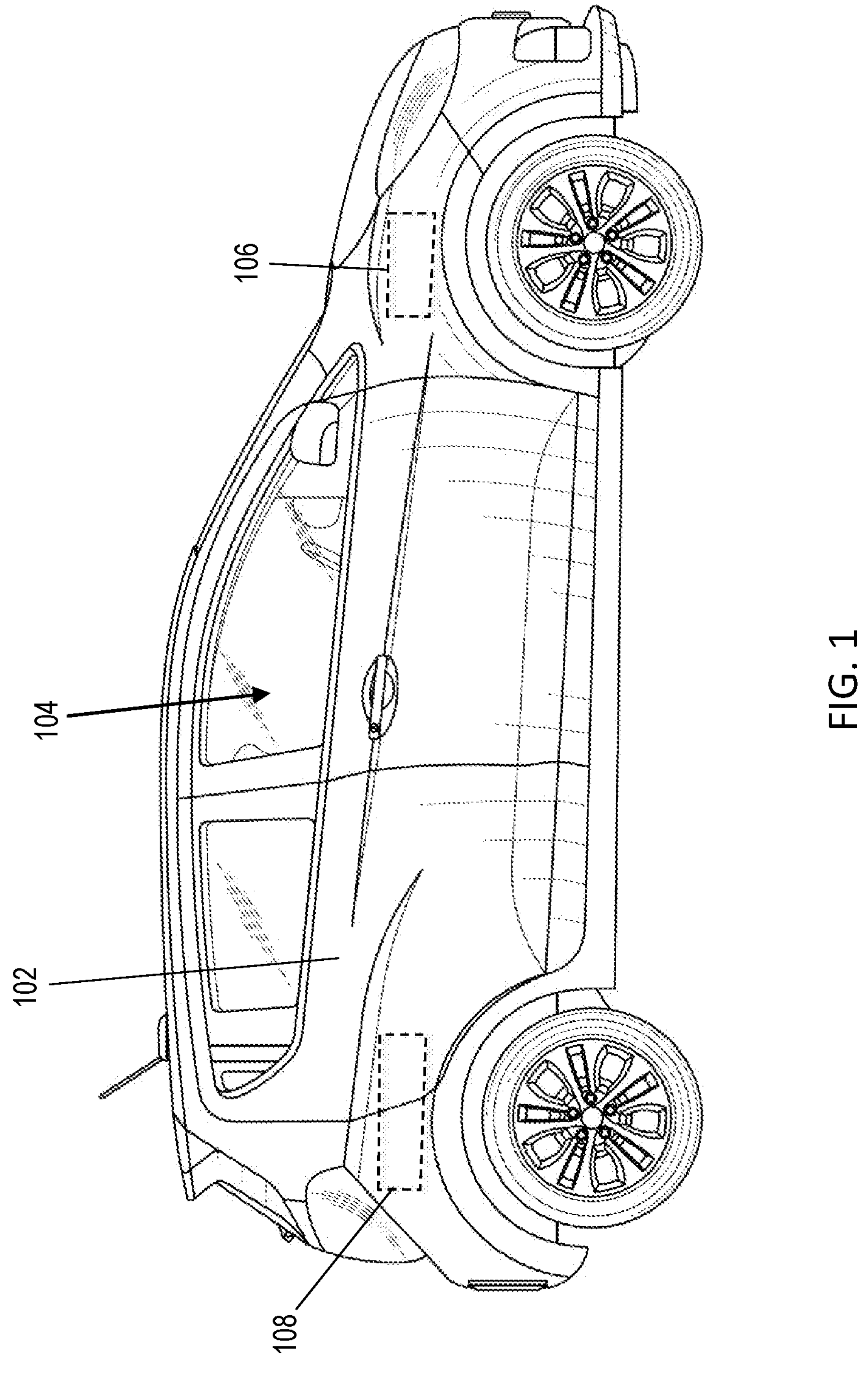
FIG. 1 is a vehicle configured in accordance with one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

As discussed previously, modern automotive high voltage battery packs often use adhesives and sealers to join structural components and to manage dynamic behaviors internal to the battery pack. Due to the complexity and packaging limitations of battery assemblies, adhesive joints can be very large, spanning up to the order of square meters, and can be inaccessible after the assembly process.

Nevertheless, disassembly in service, remanufacturing, rework, and recycling of the battery pack and/or individual components (e.g., cells) may be required. For example, regular monitoring of the battery's state of health (SOH) is vital to assess its performance and to detect any potential issues early on. Pack monitoring involves measuring the battery's capacity, internal resistance, and voltage characteristics to evaluate its overall health and remaining life. In some cases, individual battery cells may degrade faster than others, leading to an imbalance in the battery pack. In such situations, replacing the degraded cells can help restore the battery's performance. These situations often require the removal of local cell(s), structural, electrical, and thermal components, and/or addressing internal electrical failures (e.g., shorts). Unfortunately, the size and positioning of the adhesive joints in a battery pack can make disassembly when servicing the pack or at end of life challenging or impossible.

Moreover, these procedures are ideally completed while minimizing the waste generated when disposing wholly or partially functional sections of a battery pack. Adhesively bonded sections of a battery pack often have to be disposed of in large modular pieces or sections to avoid cell or critical component damage or rupture. Current solutions involve shredding and chemical treatment of large assemblies to isolate recyclable materials and the use of very weak adhesives that act as a fuse during disassembly. These relatively weak adhesives allow for easier service but drive cost, complexity, and mass into other structural components and result in non-optimal designs.

This disclosure introduces the use of a thermally triggered adhesive release for battery pack servicing. Rather than relying on relatively weak adhesives with poor structural and/or stability tradeoffs, described herein is a method for thermally weakening relatively strong adhesive joints in a battery pack during end of life and/or remanufacturing scenarios without sacrificing the performance of the joint design during vehicle operation. In some embodiments, an adhesive joint can be changed from a structural state (a relatively higher adhesive strength) to a serviceable state (a relatively lower adhesive strength) by applying targeted heating at the adhesive joint. In some embodiments, heat is applied by flowing a heating fluid (air, coolant, water, etc.) through a manifold, duct, or channel in a structural element of a Rechargeable Energy Storage System (RESS) to heat a surface bonded to the respective adhesive joint. The structural element can include, for example, existing thermal management systems, such as a cold plate, of a battery pack.

Leveraging preexisting structural elements of a battery pack to deliver a targeted, thermally triggered adhesive release in accordance with one or more embodiments offers several technical advantages over other battery pack servicing approaches. Notably, high strength adhesives can be used during the life of a battery module/pack for improved cell retention and stability that can be selectively removed, during end of life or service, without damaging thermal management equipment (heat sinks), electrical isolation surfaces, or causing cell rupture. Other advantages are possible. For example, heating operations provided can be controlled such that the adhesive itself exceeds a specified temperature for a specified breakdown duration without overheating non-targeted components and structures. In other words, the targeted heating described herein allows the adhesive joint to reach higher temperatures than the remainder of the RESS assembly, enabling any temperature sensitive components to remain within their operating and safety limits.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Within the body 102 are arranged a number of components, including, for example, an electric motor 106 (shown by projection under the front hood). The electric motor 106 is shown for ease of illustration and discussion only. It should be understood that the configuration, location, size, arrangement, etc., of the electric motor 106 is not meant to be particularly limited, and all such configurations (including multi-motor configurations) are within the contemplated scope of this disclosure.

The electric motor 106 is powered via a battery pack 108 (shown by projection near the rear of the vehicle 100). The battery pack 108 is shown for ease of illustration and discussion only. It should be understood that the configuration, location, size, arrangement, etc., of the battery pack 108 is not meant to be particularly limited, and all such configurations (including split configurations) are within the contemplated scope of this disclosure. Moreover, while the present disclosure is discussed primarily in the context of a battery pack 108 configured for the electric motor 106 of the vehicle 100, aspects described herein can be similarly incorporated within any system (vehicle, building, or otherwise) having an energy storage system(s) (e.g., one or more battery packs or modules), and all such configurations and applications are within the contemplated scope of this disclosure.

During normal operation and storage battery cells (refer to FIG. 2) must be kept within regulated temperature ranges (limits) to operate efficiently and to prevent damage or degradation. These temperature limits are more restricted during cell operation, such as when the electric motor 106 is drawing from the battery pack 108, than during non-operating conditions, as a result of the current draw through the battery pack 108 when under load.

Adhesives and polymers used in batteries often have relatively low glass transition temperatures when used in automotive applications. This is a result of the need to cure battery assemblies at low or room temperatures rather than in an oven to limit exposing the battery cells to high temperatures. In some embodiments, a thermally triggered adhesive release scheme can take advantage of the relatively low glass transition temperatures found in automotive adhesives. In particular, adhesives can be selected such that the glass transition temperatures are lower than the maximum temperature limits of the temperature-sensitive components (e.g., battery cells) such that a targeted application of heat to the adhesive can soften the adhesive into a low adhesion, high elongation serviceable state without damaging the components. In this manner, the components can be removed without thermal damage. In some embodiments, a targeted application of heat can be directed to the adhesive by way of the preexisting thermal management systems, such as a cold plate, of the battery pack 108. The configuration and use of thermal management systems and cold plates are discussed in greater detail with respect to FIGS. 2 and 3.

Figure 2:
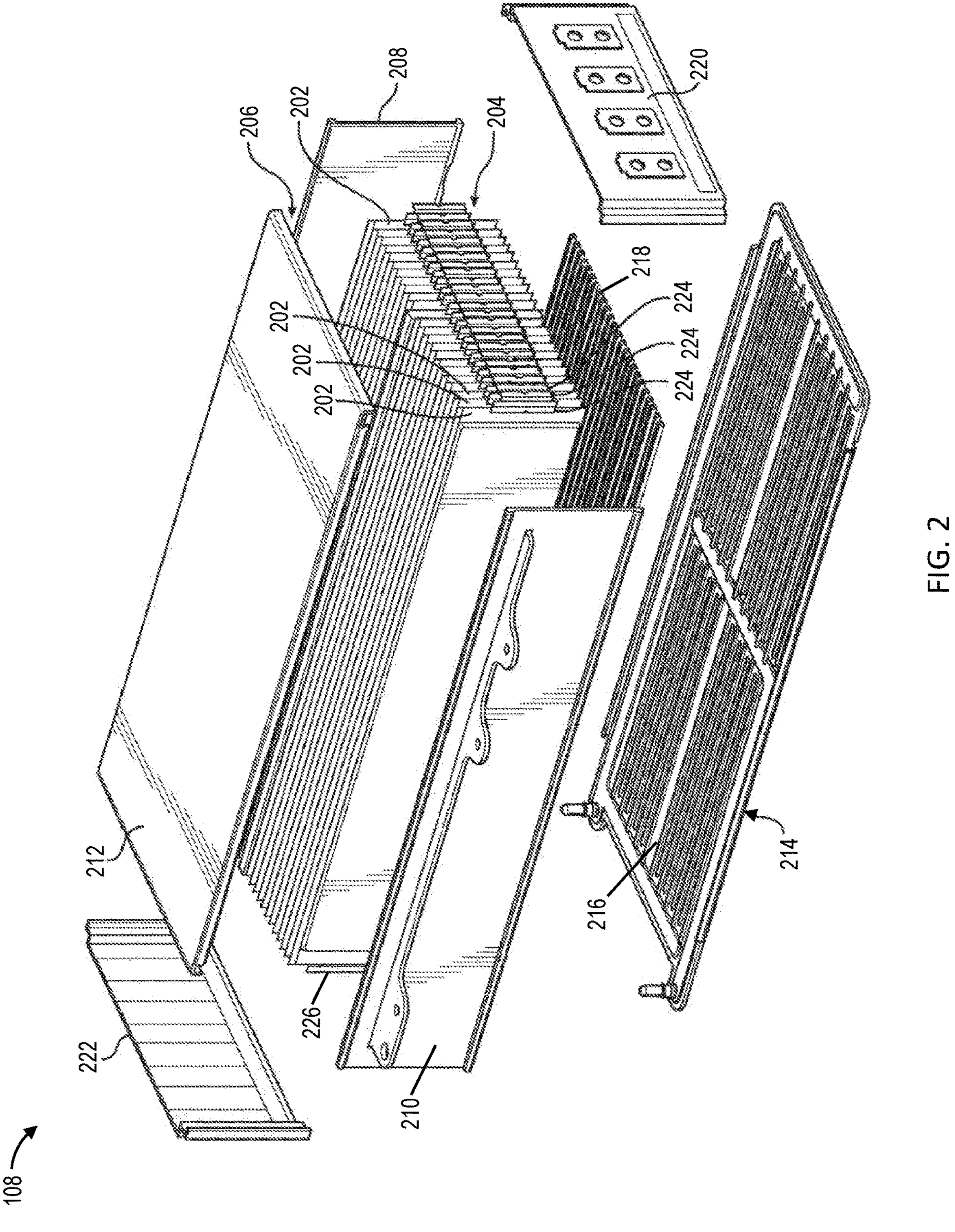
FIG. 2 is a battery pack configured in accordance with one or more embodiments.

FIG. 2 illustrates an example configuration of a battery pack (e.g., the battery pack 108 of FIG. 1) in accordance with one or more embodiments. As shown in FIG. 2, the battery pack 108 includes a plurality of battery cells 202 arranged in a battery stack 204. Each of the battery cells 202 in the battery pack 108 generates and stores electrical energy through heat-producing electro-chemical reactions. Note that FIG. 2 depicts the battery pack 108 in a disassembled state for ease of illustration and discussion.

In some embodiments, the battery pack 108 includes an enclosure or housing 206. The housing 206 is configured to maintain arrangement of the battery cells 202 in the battery stack 204, protect the battery cells 202 from damage, and facilitate mounting of the battery pack 108 in its operative environment (such as in the vehicle 100 of FIG. 1 as discussed previously). In some embodiments, the housing 206 includes a first side plate 208, a second side plate 210, and a cover or top plate 212 attached to the first side plate 208 and the second side plate 210.

In some embodiments, the battery pack 108 includes a thermal management system 214 configured to manage heat transfer from the battery stack 204 to the environment. In some embodiments, the thermal management system 214 includes a cooling plate 216 (also referred to as a cold plate). In some embodiments, the thermal management system 214 and/or the cooling plate 216 is attached to the first side plate 208 and/or the second side plate 210 to secure the battery stack 204 within the housing 206.

In some embodiments, an adhesive layer 218 is applied between the cooling plate 216 and the battery stack 204 to secure the battery stack 204 to the thermal management system 214. As described previously, the adhesive layer 218 can be made of a material selected such that the glass transition temperature of the adhesive layer 218 is below a maximum temperature (thermal limit) of one or more temperature-sensitive components (e.g., the battery cells 202 of the battery stack 204). In this manner, the adhesive layer 218 can be weakened until the component can be readily removed for servicing, replacement, etc. A thermally triggered adhesive release for the adhesive layer 218 is described in greater detail below (refer to "Thermally Triggered Adhesive Release").

As further shown in FIG. 2, in some embodiments, the battery pack 108 includes a first inter-connect board (ICB) 220 and a second ICB 222. In some embodiments, the ICBs 220, 222 can be attached to, such as pre-assembled with, the top plate 212. Accordingly, the ICBs 220, 222, the first side plate 208, the second side plate 210, the top plate 212, and the cooling plate 216 define an enclosure of the battery pack 108.

In some embodiments, each of the battery cells 202 of the battery stack 204 includes first terminals 224 (also referred to as electrical terminal or contact tabs) and second terminals 226, each arranged on opposite ends of a respective battery cell as shown. In some embodiments, one of the first terminals 224 and the second terminals 226 are positive terminals, and the others are negative terminals. In some embodiments, the first terminals 224 are electrically coupled to the first ICB 220, and the second terminals 226 are coupled to the second ICB 222.

Thermally Triggered Adhesive Release

Figure 4:
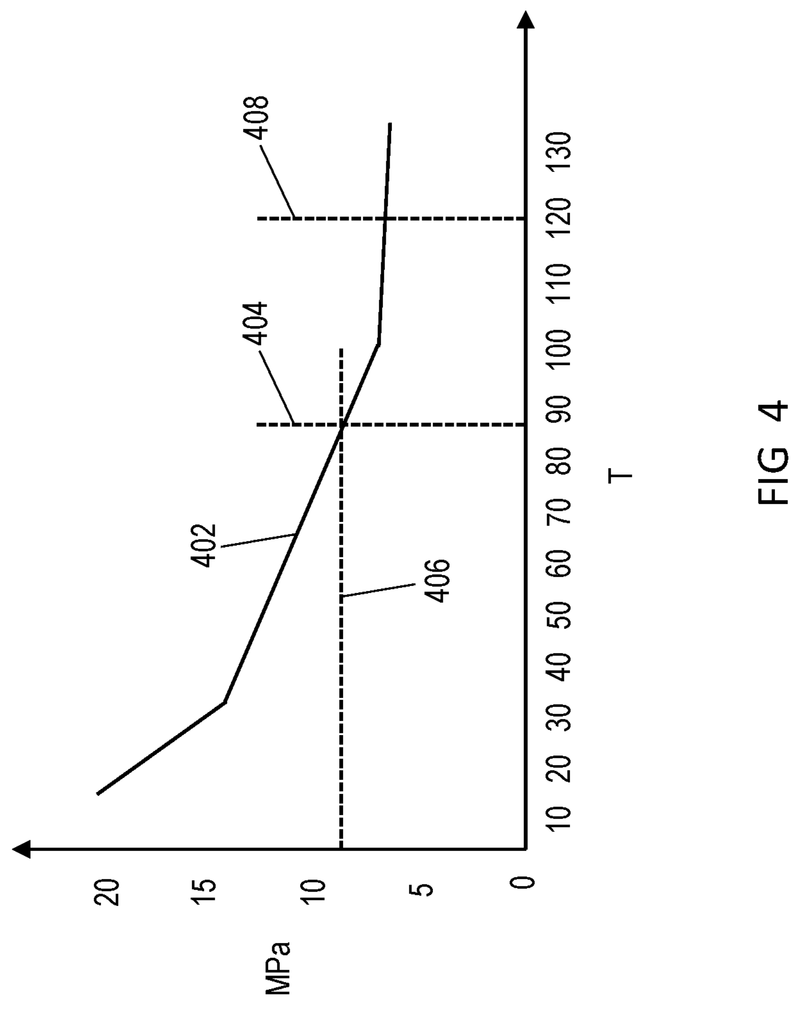
FIG. 4 is a graph depicting the relationship between bond strength and temperature in accordance with one or more embodiments.

In some embodiments, the adhesive glass transition strength and bulk properties of the adhesive layer 218 are formulated such that the adhesive strength and material elongation provide the battery stack 204 with a predetermined (design) cell retention metric at a maximum cell operating temperature such that a likelihood of the battery cells 202 being damaged during an impact and/or other high load events does not lead to cell damage while ensuring that the adhesive strength can still be degraded before exceeding the temperature design limits of the battery cell. Observe that, as the material strength begins to degrade below the glass transition temperature, the adhesion strength and hardness will decrease. FIG. 4 describes the relationship between bond (adhesive) strength and temperature in greater detail.

In some embodiments, the adhesive layer 218 includes one or more chemical additives and/or release agents. The chemical additives and/or release agents can be selected to provide a reaction to assist with the degradation/removal of the adhesive layer 218. This reaction could be permanent (latching) or temporary. Temporary degradation would require a servicing procedure (removal) to be done while maintaining a sufficient adhesive temperature, whereas a latching reaction would allow the battery pack 108 to cool before subsystem removal (i.e., before removal of the battery stack 204 or one or more of the battery cells 202). In some embodiments, latching reactions require a more targeted heating to reduce incidental degradation of adjacent subsystems. In some embodiments, a chemical additive reduces the bulk material strength and/or superficial adhesive bond resulting in a material failure of the adhesive layer 218 during removal. In some embodiments, a release agent can be applied to the substrate (an attached component(s), e.g., to the thermal management system 214, the cold plate 216, the battery stack 204, etc.) prior to application of the adhesive layer 218. In some embodiments, the release agent can be activated to initiate an adhesive failure causing debonding of the adhesive layer 218 from the substrate.

Observe that any adhesive heating needs to be provided in a delicate and engineered manner to prevent damage to the battery cells 202, damage to the battery stack 204, and/or reduction in life of the battery pack 108. In some embodiments, targeted application of local heating to the adhesive layer 218 is achieved by flowing a temperature regulated fluid (air, coolant, etc.) through a preexisting channel system or manifold designed into one or both of the bonded components, and against which the adhesive layer 218 is applied (e.g., to the interface between the cooling plate 216 and the battery stack 204 on which the adhesive layer 218 is formed and/or deposited). For example, the temperature regulated fluid can be passed through channels in the cooling plate 216.

Leveraging a fluid-based heating directly at the bonding surface allows the adhesive layer 218 to be exposed to the heat energy of the heating process prior to the other components in the system and to achieve higher temperatures than the other components not in direct contact with the bonded surface.

Notably, heating the adhesive layer 218 via preexisting channel systems or manifolds in this manner allows for convective heat transfer, offering improved control of heat energy as compared to dominantly conduction-based heating systems that are prone to overheating. For example, conduction-based systems such as soak ovens require heating from the outside into the battery pack 108 and therefore do not natively segregate adhesive joints from temperature-sensitive components. In another example, while heated probes/wires allow for direct application of a conductive heat path to an adhesive, these types of systems require excess heating of the probe/wire to reach the desired temperatures in the adhesive joint due in part to the significantly lower thermal mass of the probe than the joint being heated. The result is a natively uncontrolled overheating of sensitive components that also requires physical access to the part, which is often prohibitive.

In some embodiments, the fluid manifold used for heating the adhesive layer 218 may be formed using existing structural members such as corrugated hollow sections in the cooling plate 216 and/or may be uniquely designed for fluid flow such as coolant systems or exhaust gas manifolds in the thermal management system 214 and/or any subcomponent/portion of the battery pack 108.

In some embodiments, to separate a structural thermal interface adhesive used for cell retention to a cooling system (i.e., to cause a thermally triggered adhesive release of the adhesive layer 218), heated fluid (e.g., air) can be plumbed into manifolds in the thermal management system 214 and flowed under the adhesive layer 218 to increase the temperature of the cooling plate 216. As the metal material of the cooling plate 216 increases in temperature so will the adhesive layer 218 bonded to the surface of the cooling plate 216.

In some embodiments, the adhesive layer 218 includes a relatively low interfacial thermal resistance (i.e., a lower interfacial thermal resistance than the battery stack 204), a relatively low thermal mass (as compared, e.g., to the cooling plate 216 and the battery stack 204), and a relatively thin through plane bond line (i.e., a lower thickness orthogonal to the heating path than the other components). In this manner, the adhesive layer 218 will heat at a faster rate than other interfacing components (e.g., the battery stack 204).

Note that, while the adjoining cell (e.g., the battery cells 202 of the battery stack 204) will begin to increase in temperature at a similar rate to the adhesive layer 218 due to the high thermal conductivity of the adhesive layer 218 thermal interface, the cell internals' significantly higher thermal mass and interfacial resistance through the electrolyte to the cell external surface will result in the adhesive layer 218 reaching the necessary temperatures to enter serviceable conditions prior to the cell internals reaching sufficient temperatures to trigger damage and/or degradation of the materials internal to the battery cells 202. Advantageously, the targeted and convective heat transfer nature of the thermally triggered adhesive release described herein allows significantly faster heating of the bonding joint using lower temperature heat sources, allowing maximum possible temperatures at the adhesive layer 218 while remaining within the design (thermal limit) temperatures of the battery components.

In some embodiments, a service transition temperature for removing the adhesive layer 218 is set such that the thermal resistance between the temperature sensitive components (electronics, battery cells, etc.) and the heat source (e.g., heating fluid passed via manifolds) is greater than the thermal resistance between the adhesive layer 218 and the heat source. Alternatively, or in addition, in some embodiments, the service transition temperature can be set in consideration of the thermal mass of the temperature sensitive components relative to the thermal mass of the adhesive layer 218 such that the adhesive layer 218 will reach the service (target or soak) temperature before the temperature sensitive components reach their thermal limits.

In some embodiments, thermal analysis (e.g., 3D computational fluid dynamics or CFD) can be performed to determine and/or evaluate the time at temperature (also referred to as soak time) and to confirm that the flow of heated fluid will not result in a time-at-temperature for the temperature sensitive components that could lead to denaturing, chemical degradation, and/or melting across one or more estimated variation conditions. The estimated variation conditions can account, for example, for process variations in adhesive coverage, thickness, flow restrictions, degraded states requiring service, etc. In some embodiments, thermal analysis includes evaluating the thermal mass of the adhesive joint, the degradation temperature, and the adjacent thermal pathways in tandem.

In some embodiments, heating of the adhesive layer 218 is controlled to ensure that the adhesive layer 218 is soft enough during removal that delamination forces are below a predetermined threshold. For example, delamination forces can be maintained below a threshold above which secondary effects are empirically known. Those effects can include, for example, plastic deformation, rupture of coolant carrying channels, rupture of combustion gas carrying channels, loss of isolation in dielectric coatings, etc.

In some embodiments, heating of the adhesive layer 218 is controlled by manipulation of the flow rate and/or temperature of the heating fluid passed through the manifolds of the thermal management system 214. In some embodiments, heating of the adhesive layer 218 is controlled such that the temperature of surrounding components (including the component to be removed and neighboring components) does not exceed thermal limit conditions or critical performance thresholds. For example, if a battery cell exceeds its temperature limit the cell may undergo cell damage, while exceeding storage and non-operating temperature limits will result in internal degradation of the chemical and electrical composition of the cell that, after a period of time determined by the cell design, would result in reduction of operating life or charge/discharge performance. In another example, exposing other adhesive or sealer joints in the battery pack 108 to the service temperatures required to remove the adhesive layer 218 can result in incidental failures and/or incidental release of other components (other modules) in the battery pack 108.

Once the adhesive layer 218 has been soaked at the service transition temperature (a temperature sufficient to lower the bond strength below a predetermined value), the component (e.g., battery stack 204) can be removed.

There are two general techniques for removing the adhesive layer 218 post-soak. First, the targeted subsystem (e.g., the battery stack 204) can be removed using a peel, shear, and/or tensile loading resulting in the cohesive or adhesive failure of the adhesive layer 218 (dependent on the prior techniques employed for ensuring adhesive degradation as described earlier). In some embodiments, the targeted subsystem is removed by starting a failure of the adhesive layer 218 at an edge of the adhesive layer 218. For example, by applying force at the edge of the adhesive layer 218 post-soak. In this manner, deflection remains in the elastic deformation region of the subsystem/heat sink (e.g., cooling plate 216).

In some embodiments, prior to removal of the subsystem, testing and/or simulation of the process (via, e.g., 3D finite element analysis or FEA) can be undertaken to evaluate that other systems remaining after servicing do not undergo plastic deformation beyond predetermined tolerances and/or that a stress pathway acting on the adhesive layer 218 prioritizes a peel failure in the adhesive material rather than emphasizing a progressive failure. In this manner, the energy imparted into the surrounding system can be reduced.

Alternatively (secondly), the targeted subsystem (e.g., battery stack 204) can be disassembled by cutting the adhesive layer 218 using a tool. In some embodiments, a wire cutting method can be employed to cut the adhesive layer 218 in a similar manner as carried out in other industries or service applications, such as in windshield removal. Notably, cutting the adhesive layer 218 can be made easier by reducing the bulk or adhesive strength of the adhesive material (and as a result the hardness) using the heating method previously described. In some embodiments, a cord, wire, and/or thread can be routed around the adhesive layer 218 such that the wire or thread encompasses an area on three or more sides of the targeted component. In this manner, a force can be applied to the adhesive layer 218 and the targeted component can be put under tension from one or more ends substantially simultaneously. In some embodiments, the cord, wire, and/or thread is then pulled through the adhesive layer 218, thereby cutting the adhesive material and released the targeted subsystem. For electrically charged subsystems where maintaining isolation in coating surfaces is critical, flanges or dielectric separators can be placed, in some embodiments, on the targeted subsystem to deflect the cord, wire, and/or thread towards the mating substrate (the adhesive interface) in a manner that respects (maintains) design clearance requirements.

An overall process for a thermally triggered adhesive release generally includes the following steps:

Step 1. During assembly place an adhesive on a surface of a component interface (e.g. a battery cell, cold plate, etc.). In some embodiments, the adhesive has a known joint strength vs. temperature profile.

Step 2. Mate two or more components and wet out the adhesive.

Step 3. Let the adhesive cure to define an adhesive joint between the two or more components.

Step 4. Perform necessary debussing/pre-service so the targeted components (a module, cells, cell array, cold plate, other component) can be removed from the adhesive joint.

Step 5. Flow hot air or heating fluid through the battery cold plate/thermal management system (via, e.g., manifolds as described previously). For example, the hot air or heating fluid can be passed through the system at a temperature of 60 degrees Celsius, although other temperatures are within the contemplated scope of this disclosure.

Step 6. Monitor the cell temperature and/or adhesive temperature.

Step 7. Once the adhesive joint has reached the target temperature for the desired amount of time, remove the cells, module, cell array, cold plate, other component, etc.

Step 8. Clean the system. In some embodiments, residual adhesive material is removed from the interface so that a fresh adhesive can be positioned without interference.

Step 9. Let the system cool.

Step 10. For servicing applications, replace the targeted component with a new component. For example, a removed battery stack 204 (or battery cell, module, cooling plate, etc.) can be replaced with a new and/or repaired component.

Figure 3:
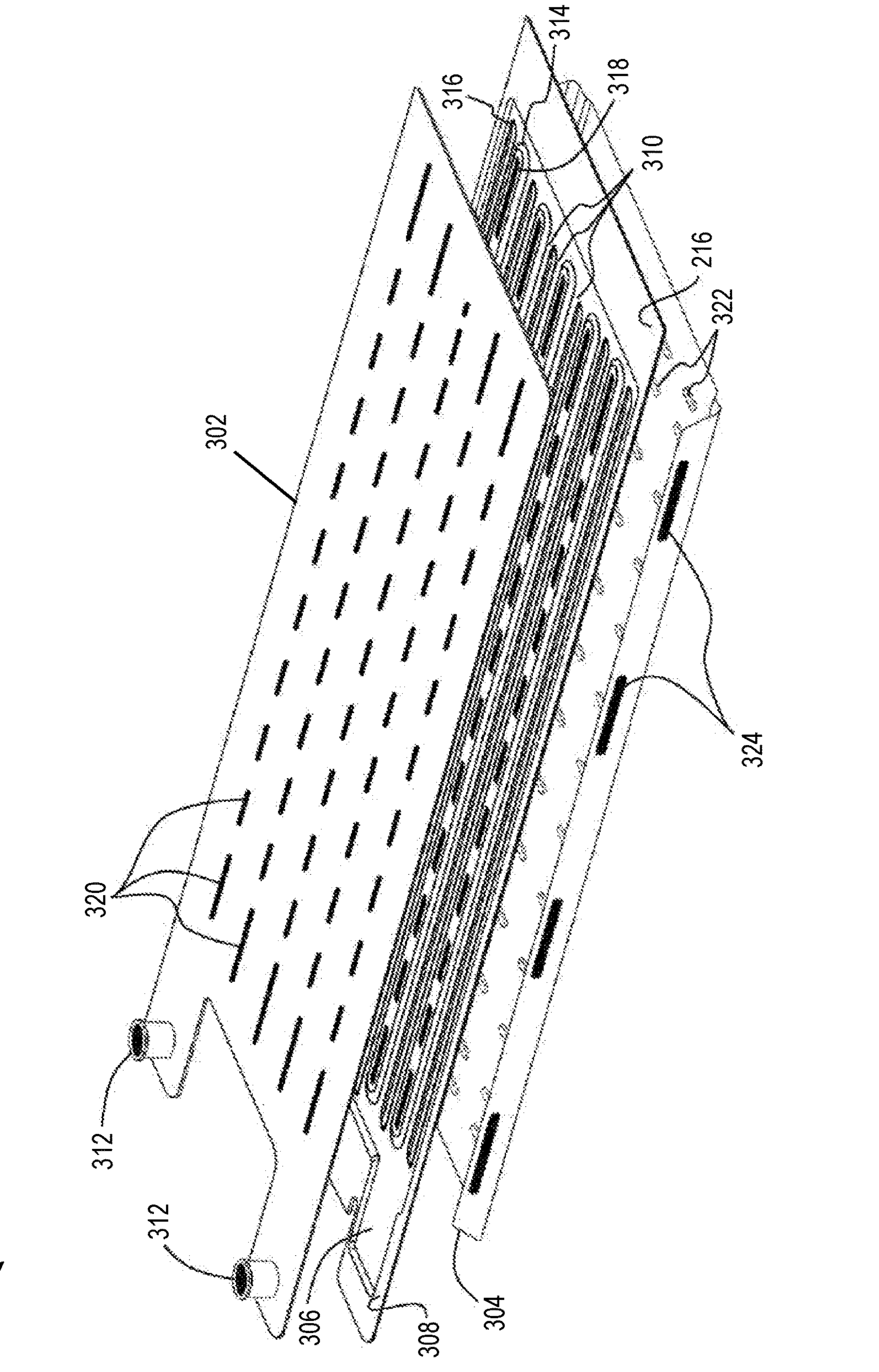
FIG. 3 is a thermal management system of the battery pack of FIG. 2 configured in accordance with one or more embodiments.

FIG. 3 illustrates an example configuration of a thermal management system (e.g., the thermal management system 214 of FIG. 2) in accordance with one or more embodiments. As shown in FIG. 3, the thermal management system 214 includes the cooling plate 216. In some embodiments, the cooling plate 216 can operate via air cooling. In some embodiments, the cooling plate 216 can operative via a cooling fluid (not separately shown).

In some embodiments, the thermal management system 214 can include an upper tray 302 and a lower tray 304 sealably joined to opposite surfaces of the cooling plate 216 to define an enclosed volume 306 therebetween. In some embodiments, the cooling plate 216 can include a peripherally disposed, raised lip 308. In some embodiments, the cooling plate 216 and the upper tray 302 can be complementarily shaped to allow sealable joining around the perimeter of the cooling plate 216 at the raised lip 308.

In some embodiments, the enclosed volume 306 can include one or more fluid flow channels 310 and fluid inlet and outlet couplings 312 to enable circulation of a cooling fluid (not separately shown) through the enclosed volume 306. While not meant to be particularly limited, the cooling fluid can include, for example, air, water, glycols (e.g., ethylene glycol, propylene glycol, etc.), dielectric fluids (e.g., mineral oils, synthetic oils, etc.), fluorinated liquids (e.g., perfluorocarbons (PFCs)), hydrofluoroolefins, coolant mixtures, and/or phase change materials (PCMs).

As discussed previously, in some embodiments, heat is applied to the adhesive layer 318 by flowing a heating fluid (air, water, the cooling fluid itself after heating, etc.) through the preexisting fluid flow channels 310 provided for the cooling fluid. Alternatively, or in addition, in some embodiments, the cooling plate 216 can be provided with one or more dedicated channels (any of the fluid flow channels 310) specifically reserved for the heating fluid.

In some embodiments, the cooling plate 216 includes one or more elongated ribs 314 defining the fluid flow channels 310 (also referred to as coolant or refrigerant circulation tubes). In some embodiments, the ribs 314 rise from a bottom surface 316 of the cooling plate 216 to contact an opposite side (not separately shown) of the upper tray 302. In some embodiments, the ribs 314, the upper tray 302, and the raised lip 308 can be complementarily shaped and sealably joined to define the enclosed volume 306.

In some embodiments, the ribs 314 can include one or more through slots 318 and the upper tray 302 can include one or more complementary through slots 320. As used herein, the slots are "complementary" in that they are physically aligned (i.e., such that they are vertically stacked). In some embodiments, sealable joints (not separately shown) are made around a perimeter of the through slots 318, 320 at the interface of the ribs 314 and the upper tray 302.

The ribs 314 can be arranged as desired, and may be, for example, periodic and discontinuous (as shown). In other embodiments, the ribs 314 can be made of a singular shape that is continuous along the length of the ribs 314 (not separately shown).

In some embodiments, the lower tray 304 serves as a carrier engaged with the cooling plate 216. In some embodiments, the lower tray 304 can include one or more support ribs 322 which extend upwardly to engage with the underside of the ribs 314. The support ribs 322 may be elongated transverse (as shown) to the elongated ribs 314 and/or elongated along (not separately shown) the length of the ribs 314. In some embodiments, the lower tray 304 includes attachment slots 324 to engage with ramped or barbed retention features (not shown) of an external component (e.g., portions of the battery pack 108 and/or mounting structures within the vehicle 100).

The upper tray 302, lower tray 304, and the cooling plate 216 can be made of metal or metal alloys. For example, in some embodiments, the upper tray 302, lower tray 304, and/or the cooling plate 216 can be manufactured from clad aluminum alloy sheet stock. The ribs 314, through slots 318, 320, support ribs 322, and/or attachment slots 324 can be punched, cut (such as by laser or water jet processes), or alternatively manufactured. Variable height features (e.g. ribs 314, raised lip 308, etc.) can be press formed, roll formed, hydroformed, or alternatively manufactured. The upper tray 302, lower tray 304, and the cooling plate 216 can be sealably joined by any effective bonding process including, for example, brazing.

FIG. 4 illustrates a graph 400 depicting the relationship between bond strength (here, measured in MPa along the Y-axis) and temperature (here, measured in degrees Celsius along the X-axis) for an example adhesive in accordance with one or more embodiments. As shown in FIG. 4, bond strength decreases as the temperature of the adhesive increases, as defined by a bond strength curve 402. The bond strength curve 402 is merely illustrative, and it should be readily understood that the bond strength curve 402 will vary depending on the adhesive selected for a given application.

As further shown in FIG. 4, a service temperature 404 exists such that the bond strength of the adhesive drops below a predetermined removal threshold 406. In some embodiments, the service temperature 404 is the glass transition temperature of the respective adhesive, although temperatures above and below the glass transition temperature can be used (note that, for ease of component removal, temperatures below the glass transition temperature should only be used when required to prevent out-of-spec thermal loads to the targeted component and/or other components (i.e., when there is not enough thermal bandwidth to achieve the glass transition temperature without risking component damage and/or degradation). Observe that the service temperature 404 is below a maximum temperature limit 408 of a temperature-sensitive component (the targeted component and/or another component).

In some embodiments, the thermal load (heating) of the adhesive layer 218 can be actively monitored via attached and/or embedded thermocouples (not separately shown). In some embodiments, the incidental heating of the targeted component and/or any other component can be similarly measured while applying heat to the adhesive layer 218.

In some embodiments, the measured temperature of the adhesive layer 218 is compared against a predetermined target, such as, for example, the service temperature 404. In some embodiments, the measured temperature of the targeted component and/or any other component can be compared against a predetermined threshold, such as, for example, the maximum temperature limit 408.

In some embodiments, a temperature and/or a flowrate of a heating fluid (refer to FIG. 3) can be changed responsive to the measured temperature of the adhesive layer 218 and/or the measured temperature of the targeted component and/or any other component. For example, the temperature and/or a flowrate of the heating fluid can be increased to increase heat transfer into the adhesive layer 218 or decreased to decrease heat transfer into the adhesive layer 218 as needed. In some embodiments, the temperature and/or a flowrate of the heating fluid can be actively adjusted until the adhesive layer 218 reaches the service temperature 404. In some embodiments, the temperature and/or a flowrate of the heating fluid can be actively adjusted to maintain the service temperature 404 for the designed soak time.

Figure 5:
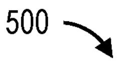
FIG. 5 is a flowchart in accordance with one or more embodiments.
Figure 5:
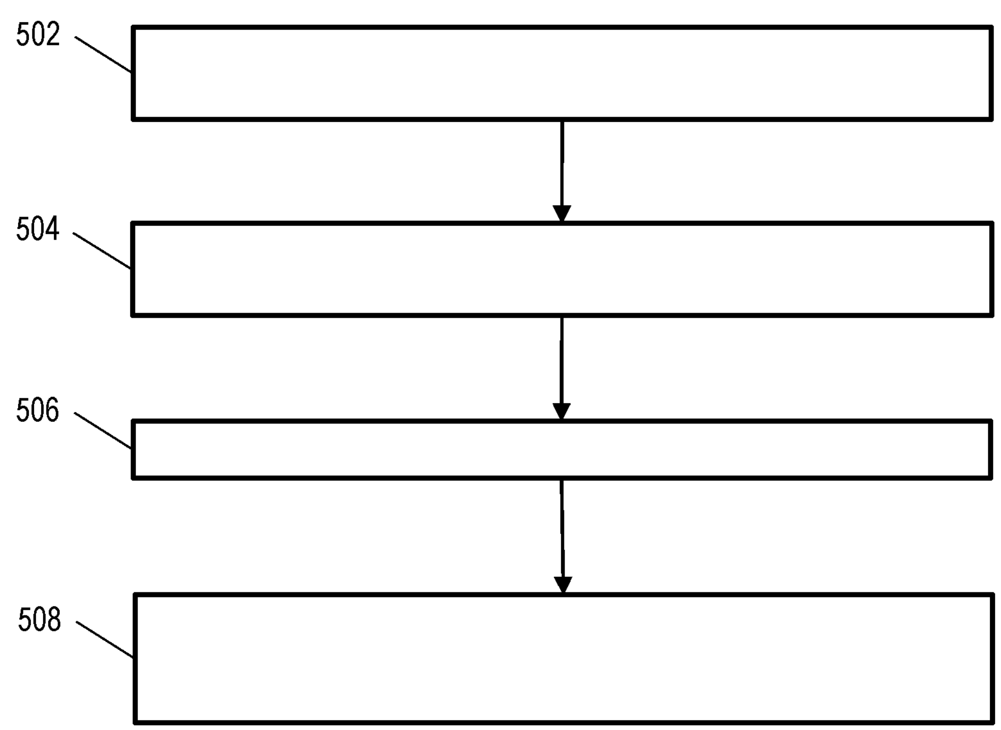

Referring now to FIG. 5, a flowchart 500 for leveraging a thermally triggered adhesive release for battery service is generally shown according to an embodiment. Although depicted in a particular order, the blocks depicted in FIG. 5 can be rearranged, subdivided, and/or combined.

At block 502, the method includes receiving a battery pack including an adhesive layer at an interface between a cooling plate and a component. In some embodiments, the adhesive is made of a material having a known bond strength as a function of temperature.

At block 504, the method includes directing a heating fluid through an enclosed volume of the cooling plate. In some embodiments, directing the heating fluid through the enclosed volume causes a convective heat transfer from the heating fluid to the adhesive layer. In some embodiments, the enclosed volume includes one or more fluid flow channels, a fluid inlet, and a fluid outlet for circulation of the heating fluid. A heating fluid can be directed through an enclosed volume of the cooling plate by actuating one or more values coupled to a source of the heating fluid coupled to the fluid inlet (source and values not separately shown).

At block 506, the method includes measuring a temperature of the adhesive layer. The temperature can be measured using, for example, a thermocouple.

At block 508, the method includes, responsive to determining that the temperature has reached a target temperature, applying a load to the component until the component is removed. In some embodiments, applying the load to the component includes applying one or more of a peeling load, a shearing load, and a tensile load to the component until cohesive or adhesive failure of the adhesive layer. In some embodiments, a component of a thermal management system can direct the load by activating, directing, or otherwise controlling a device (e.g., an actuator coupled to a pressing structure) to apply the load.

In some embodiments, the method includes measuring a temperature of the component and decreasing one or more of a flowrate and a temperature of the heating fluid responsive to the temperature of the component being within a predetermined threshold of a thermal limit.

In some embodiments, the method includes performing a pre-service such as a debussing prior to directing the heating fluid through the enclosed volume of the cooling plate.

In some embodiments, the method includes replacing the removed component with a new component.

Figure 6:
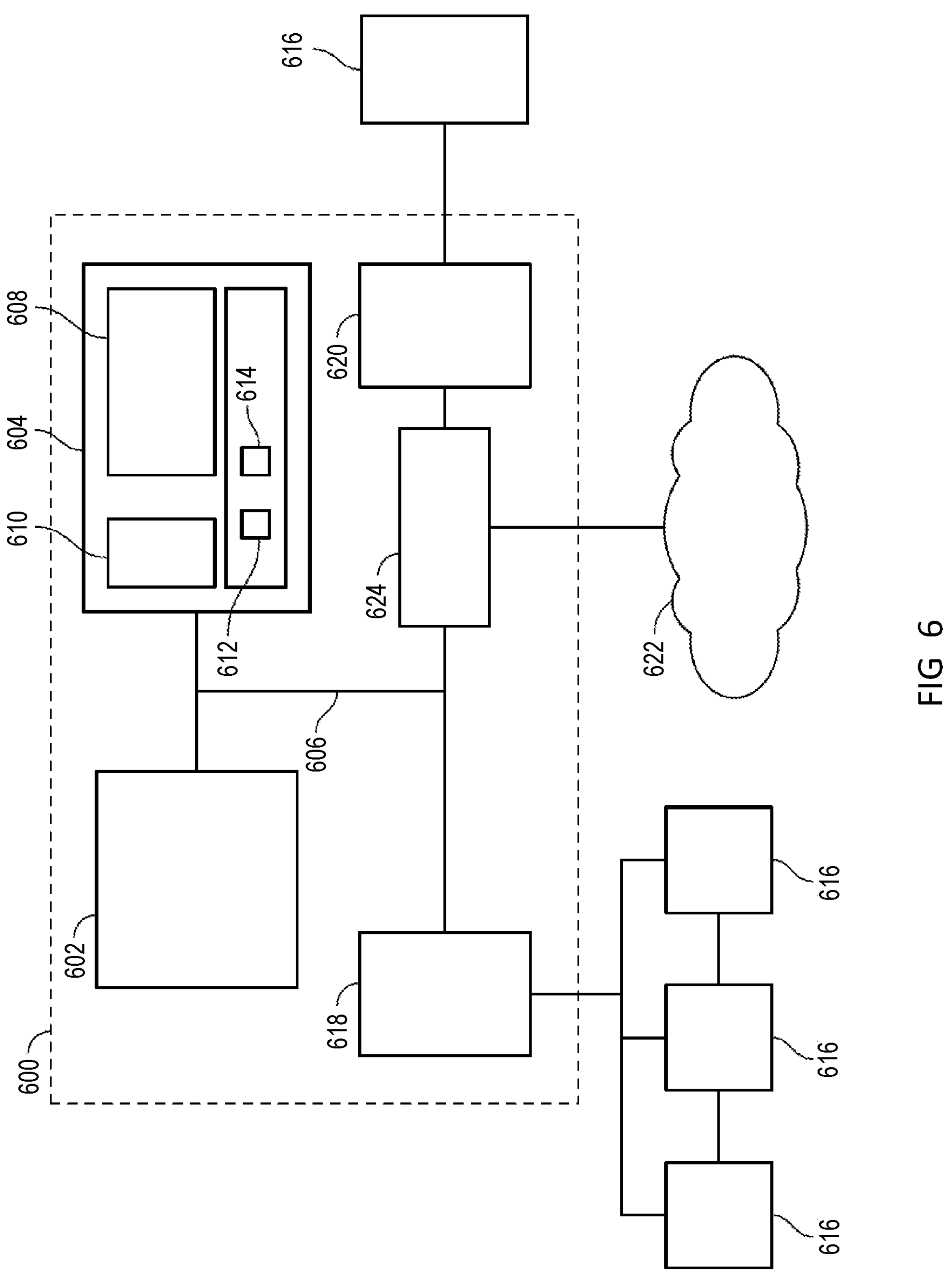
FIG. 6. is a computer system according to one or more embodiments.

FIG. 6 illustrates aspects of an embodiment of a computer system 600 that can perform various aspects of embodiments described herein. In some embodiments, the computer system 600 can be incorporated as an external system (e.g., as a module communicatively coupled to the vehicle 100 and/or battery pack 108) and/or as an internal system (e.g., as an electronic control unit or ECU of the vehicle 100 of FIG. 1). In some embodiments, the computer system 600 can be configured to receive signals (e.g., an adhesive temperature, a component temperature, etc.) from one or more cells or components of a battery pack.

The computer system 600 includes at least one processing device 602, which generally includes one or more processors for performing a variety of functions, such as, for example, controlling power delivery of an electric motor (e.g., the electric motor 106 of FIG. 1) to one or more wheels of a vehicle (e.g., the vehicle 100), controlling charge/discharge rates of one or more batteries (e.g., the battery pack 108 of FIG. 1), controlling heating fluid delivery (temperature and flow rate) to an adhesive layer (e.g., the adhesive layer 218), and/or monitoring a status (e.g., temperature) of the adhesive or any other component (e.g., cells) of the battery pack.

Components of the computer system 600 include the processing device 602 (such as one or more processors or processing units), a system memory 604, and a bus 606 that couples various system components including the system memory 604 to the processing device 602. The system memory 604 may include a variety of computer system readable media. Such media can be any available media that is accessible by the processing device 602, and includes both volatile and non-volatile media, and removable and non-removable media.

For example, the system memory 604 includes a non-volatile memory 608 such as a hard drive, and may also include a volatile memory 610, such as random access memory (RAM) and/or cache memory. The computer system 600 can further include other removable/non-removable, volatile/non-volatile computer system storage media.

The system memory 604 can include at least one program product having a set (e.g., at least one) of program modules that are configured to carry out functions of the embodiments described herein. For example, the system memory 604 stores various program modules that generally carry out the functions and/or methodologies of embodiments described herein. A module or modules 612, 614 may be included to perform functions related to monitoring and/or control of the battery pack 108, such as, for example, determining one or more current cell temperatures, a current state of charge for the battery pack 108 and/or any cell of the battery pack 108, a charging duration, a charging current and/or voltage, etc. The computer system 600 is not so limited, as other modules may be included depending on the desired functionality of the vehicle 100. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. For example, the module(s) can be configured via software, hardware, and/or firmware to stop charging and/or otherwise isolate one or more cells of a battery pack of the vehicle 100.

The processing device 602 can also be configured to communicate with one or more external devices 616 such as, for example, a keyboard, a pointing device, and/or any devices (e.g., a network card, a modem, vehicle ECUs, etc.) that enable the processing device 602 to communicate with one or more other computing devices. Communication with various devices can occur via Input/Output (I/O) interfaces 618 and 620.

The processing device 602 may also communicate with one or more networks 622 such as a local area network (LAN), a general wide area network (WAN), a bus network and/or a public network (e.g., the Internet) via a network adapter 624. In some embodiments, the network adapter 624 is or includes an optical network adaptor for communication over an optical network. It should be understood that although not shown, other hardware and/or software components may be used in conjunction with the computer system 600. Examples include, but are not limited to, microcode, device drivers, redundant processing units, external disk drive arrays, RAID systems, and data archival storage systems, etc.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:

an electric motor;

a battery pack electrically coupled to the electric motor; and a thermal management system coupled to the battery pack, the thermal management system comprising a cooling plate, an upper tray, and a lower tray joined to opposite surfaces of the cooling plate to define an enclosed volume therebetween, the thermal management system further comprising:

a memory, computer readable instructions, and one or more processors for executing the computer readable instructions, the computer readable instructions controlling the one or more processors to perform operations comprising:

heating an adhesive layer for removal by modifying at least one of a flowrate and a temperature of a heating fluid through the enclosed volume;

measuring a temperature of an adhesive layer coupled to the cooling plate and a component of the battery pack;

while the adhesive layer is being heated for removal:

measuring, separately from a temperature of the adhesive layer, a temperature of the component; and decreasing a flow rate of the heating fluid responsive to the temperature of the component exceeding a thermal limit; and responsive to determining that the temperature has reached a target temperature selected based at least in part on the temperature of the component, applying a load to the component until the component is removed.

2. The vehicle of claim 1, wherein applying the load to the component comprises applying one or more of a peeling load, a shearing load, and a tensile load to the component until cohesive or adhesive failure of the adhesive layer.

3. The vehicle of claim 1, wherein the enclosed volume comprises one or more fluid flow channels, a fluid inlet, and a fluid outlet for circulation of the heating fluid.

4. The vehicle of claim 1, wherein modifying at least one of the flowrate and the temperature of the heating fluid through the enclosed volume comprises increasing one or more of the flowrate and the temperature responsive to the measured temperature being below the target temperature.

5. The vehicle of claim 1, wherein modifying at least one of the flowrate and the temperature of the heating fluid through the enclosed volume comprises decreasing one or more of the flowrate and the temperature responsive to the measured temperature being above the target temperature.

6. A thermal management system comprising:

a cooling plate, an upper tray, and a lower tray joined to opposite surfaces of the cooling plate to define an enclosed volume therebetween; and a memory, computer readable instructions, and one or more processors for executing the computer readable instructions, the computer readable instructions controlling the one or more processors to perform operations comprising:

heating an adhesive layer for removal by modifying at least one of a flowrate and a temperature of a heating fluid through the enclosed volume;

measuring a temperature of an adhesive layer coupled to the cooling plate and a component of a battery pack;

while the adhesive layer is being heated for removal:

measuring, separately from a temperature of the adhesive layer, a temperature of the component; and decreasing a flow rate of the heating fluid responsive to the temperature of the component exceeding a thermal limit; and responsive to determining that the temperature has reached a target temperature selected based at least in part on the temperature of the component, applying a load to the component until the component is removed.

7. The thermal management system of claim 6, wherein applying the load to the component comprises applying one or more of a peeling load, a shearing load, and a tensile load to the component until cohesive or adhesive failure of the adhesive layer.

8. The thermal management system of claim 6, wherein the enclosed volume comprises one or more fluid flow channels, a fluid inlet, and a fluid outlet for circulation of the heating fluid.

9. The thermal management system of claim 6, wherein modifying at least one of the flowrate and the temperature of the heating fluid through the enclosed volume comprises increasing one or more of the flowrate and the temperature responsive to the measured temperature being below the target temperature.

10. The thermal management system of claim 6, wherein modifying at least one of the flowrate and the temperature of the heating fluid through the enclosed volume comprises decreasing one or more of the flowrate and the temperature responsive to the measured temperature being above the target temperature.

11. A method for thermally triggering an adhesive release for battery service, the method comprising:

receiving a battery pack comprising an adhesive layer at an interface between a cooling plate and a component;

heating an adhesive layer for removal by directing a heating fluid through an enclosed volume of the cooling plate;

measuring a temperature of the adhesive layer;

while the adhesive layer is being heated for removal:

measuring, separately from a temperature of the adhesive layer, a temperature of the component; and decreasing a flow rate of the heating fluid responsive to the temperature of the component exceeding a thermal limit; and responsive to determining that the temperature has reached a target temperature selected based at least in part on the temperature of the component, applying a load to the component until the component is removed.

12. The method of claim 11, wherein the adhesive comprises a material having a known bond strength as a function of temperature.

13. The method of claim 11, wherein directing the heating fluid through the enclosed volume causes a convective heat transfer from the heating fluid to the adhesive layer.

14. The method of claim 11, wherein applying the load to the component comprises applying one or more of a peeling load, a shearing load, and a tensile load to the component until cohesive or adhesive failure of the adhesive layer.

15. The method of claim 11, wherein the enclosed volume comprises one or more fluid flow channels, a fluid inlet, and a fluid outlet for circulation of the heating fluid.

16. The method of claim 11, further comprising performing a pre-service comprising a debussing prior to directing the heating fluid through the enclosed volume of the cooling plate.

17. The method of claim 11, further comprising replacing the removed component with a new component.

* * * * *